United States Patent [19]

Fletcher et al.

[11] 4,052,302

[45] Oct. 4, 1977

[54] PROCESS OF FORMING CATALYTIC SURFACES FOR WET OXIDATION REACTIONS

[76] Inventors: James C. Fletcher, Administrator of the National Aeronautics and Space Administration, with respect to an invention of; Robert B. Jagow, San Jose, Calif.

[21] Appl. No.: 685,027

[22] Filed: May 10, 1976

[51] Int. Cl.$^2$ .............................................. C02C 5/04
[52] U.S. Cl. .................................. 210/63 R; 210/71; 204/292; 252/472; 427/229
[58] Field of Search ............................. 210/15, 16, 17; 252/472; 427/229; 204/292

[56] References Cited

U.S. PATENT DOCUMENTS

| | | | |
|---|---|---|---|
| 2,893,891 | 7/1959 | Bradstreet | 427/229 |
| 3,487,016 | 12/1969 | Zeff | 210/63 R X |
| 3,632,498 | 1/1972 | Beer | 204/290 F |
| 3,823,088 | 7/1974 | Box, Jr. | 210/63 R |
| 3,870,631 | 3/1975 | Fassell | 210/63 R |
| 3,912,626 | 10/1975 | Ely | 210/63 R X |
| 3,920,548 | 11/1975 | Fassell | 210/63 R |
| 4,013,560 | 3/1977 | Pradt | 210/63 R X |

OTHER PUBLICATIONS

Chemical Abstracts, 81:111183d (1974).
Chemical Abstracts, 82:34848r (1975).

*Primary Examiner*—Sidney Marantz
*Attorney, Agent, or Firm*—Marvin J. Marnock; John R. Manning; Marvin F. Matthews

[57] ABSTRACT

A wet oxidation process for oxidizing waste materials comprising dissolving a ruthenium salt in a reactant feed stream containing the waste materials, introducing the feed stream into a reactor, heating the reactor contents to an elevated temperature to effect deposition of a catalytic surface of ruthenium black on the interior walls of the reactor and maintaining the feed stream in the reactor for a period of time sufficient to effect at least partial oxidation of the waste materials.

12 Claims, No Drawings

PROCESS OF FORMING CATALYTIC SURFACES FOR WET OXIDATION REACTIONS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457)

BACKGROUND OF THE INVENTION

1. Field of the Invention

The present invention relates to the preparation of catalytically active surfaces and, more specifically, to the preparation of ruthenium black surfaces for use in wet oxidation process.

2. Brief Description of Prior Art

The use of catalysts in various chemical reactions is well known. Typically, the catalysts are supported on suitable solid substrates, are themselves solids and used without a substrate or are soluble in the liquid phase reaction medium. Solid or substrate supported catalysts suffer from the disadvantage that if the catalyst becomes deactivated due to poisoning, temperature upsets or the like, it is generally necessary to remove the catalyst charge from the reactor and either rejuvenate the catalyst by treatment or supply a fresh catalyst charge. In the case of soluble catalysts, it is often necessary that the reaction product leaving the reactor be processed to separate the catalyst for reuse in the reaction lest the catalyst be continuously expended.

In wet oxidation processes used to treat organic waste materials derived from the chemical, paper and sewage treatment industries, noble metal based catalysts have been employed. Thus, for example, catalysts employing rhodium, platinum or ruthenium are used. However, in the usual wet oxidation processes, the noble metal catalysts are used in the manner described above, e.g., in some form deposited on a suitable substrate or in a soluble form in the reaction mixture. Accordingly, such catalyzed wet oxidation processes suffer from the disadvantages described above in regard to catalyst poisioning, loss of activity, etc.

SUMMARY OF THE INVENTION

It is therefore an object of the present invention to provide a method for forming catalytic surfaces.

A further object of the present invention is to provide a method of forming catalytic surfaces of ruthenium black.

Still another object of the present invention is to provide a method of forming fixed, catalytically active surfaces from soluble ruthenium salts.

Yet another object of the present invention is to provide an improved wet oxidation process for treating waste product streams.

An additional object of the present invention is to provide a wet oxidation process for the treatment of waste product streams employing a ruthenium black catalytic surface.

The above and other objects of the present invention will become apparent from the description given herein and the appended claims.

In one embodiment, the above objects are realized by a method of forming a catalytic surface in which a soluble ruthenium salt is first dissolved in a suitable liquid medium. The liquid medium containing the dissolved salt is introduced into a reactor at a temperature such that a ruthenium black surface forms on the interior surfaces of the reactor.

In another embodiment of the present invention there is provided a wet oxidation process in which an aqueous waste product stream is admixed with a soluble ruthenium salt and the mixture introduced into the reactor at a temperature such that ruthenium black forms on the internal surfaces of the reactor and provides a catalytically active surface to convert the oxidizable waste materials into more easily handled breakdown products such as, for example, water, $CO_2$, etc.

DESCRIPTION OF THE PREFERRED EMBODIMENTS

The compounds useful in forming the catalytic surfaces as per the method of the present invention are the soluble salts of ruthenium which under the conditions hereafter specified will form ruthenium black surfaces which exhibit catalytic activity. Particularly preferred is ruthenium trichloride (sesquichloride). The term "soluble", as used herein, refers not only to water solubility but to solubility in other liquid mediums such as alcohol, mixtures of water miscible alcohols and water, etc. Thus, while generally speaking, in the method of the present invention aqueous solutions of the ruthenium salt e.g. trichloride will be employed, it is to be understood that other liquid mediums in which the ruthenium salt is soluble can be used.

The ruthenium trichloride or other suitable ruthenium salt is first dissolved in the liquid medium. The solution of the liquid medium and the ruthenium salt is then introduced into a suitable reaction vessel, preferably of metallic construction internally, at a temperature sufficient to effect deposition of ruthenium black on the internal surfaces of the reactor. Deposition temperatures will vary depending on the particular salt used. However, temperatures of 175° F or greater are usually sufficient, especially when the salt is ruthenium trichloride. It will be appreciated that at such elevated temperatures, and depending upon the liquid medium employed, the reactor will have to be maintained at superatmospheric pressures to avoid vaporization of the liquid medium. Under such elevated temperatures, the solubilized ruthenium salt is partially converted to ruthenium black which deposits on the internal surface of the reactor forming a fixed, substantially nonexpendable catalytic surface which exhibits high activity in wet oxidation processes.

While the precise mechanism by which the ruthenium ion in the reaction medium is converted into ruthenium black deposit on the walls of the reactor is unknown, it is believed that a form of chemical ion exchange occurs in which the ruthenium ion becomes bonded or fixed to the walls of the reactor in the form of ruthenium black, i.e. elemental ruthenium.

The precise amount of the soluble ruthenium salt dissolved in the liquid medium may vary widely depending upon the solubility of the salt, the configuration and size of the reactor, the type of reaction to be conducted in the catalytically activated reactor, etc. Thus, for example, a very small amount of the ruthenium salt can be dissolved in the liquid medium and the reactor repeatedly charged with the solution until the desired amount of ruthenium black is deposited on the walls. Generally speaking, the amount of ruthenium salt dissolved in the liquid medium need only be sufficient to provide a catalytically active surface on the internal walls of the reactor. The term "catalytically active surface" is intended to mean a surface containing sufficient ruthenium black to catalyze the reaction conducted in the "activated" reaction vessel.

One of the distinct advantages of the present invention is that should the ruthenium black catalytic surface lose its activity due to attrition from the reactor surfaces, poisoning, temperature upsets, etc., a fresh or rejuvenated catalytic surface can be supplied without the necessity for emptying the contents of the reactor such as would be necessitated in the case of a solid charge of catalyst in the reactor. Thus, were the surface to lose its catalytic activity, the soluble ruthenium salt could be added to the reactant feed to the reaction vessel while the reaction was being carried on and, by adjusting the temperature conditions to the proper range within the reactor, the formation of the catalytically active ruthenium black surface would occur. Alternately, the reaction could be terminated for a period of time sufficient to "resurface" the walls of the reactor using a separate liquid medium containing the dissolved ruthenium salt in the manner described above. In either event, the time consuming and expensive task of emptying the reactor of solid catalyst charge is avoided.

Generally speaking, the internal surfaces of the reaction vessel on which the ruthenium black is deposited will be at least partially constructed from a metallic material. As a practical matter, pressure considerations dictate that at least the reaction vessel shell be of metallic construction. It is believed that virtually any type of metal, including alloys, can be used in constructing the internal surface of the vessel. No particular configuration of the reactor is required and it will be appreciated that the precise design of the reactor will depend upon the type of reaction to be carried out once the catalytic surface coating has been formed. The term internal surfaces is intended to include not only the internal walls of the reactor but also baffles, trays, stirrers, etc., which may be affixed to or otherwise form internal surfaces which may be coated with the ruthenium black and, which, for practical purposes, can be considered an integral part of the reaction vessel.

As was earlier pointed out, certain forms of ruthenium are known to be effective in wet oxidation processes to treat waste streams such as those derived from the chemical, paper, food, and sewage industries. In such wet oxidation processes, the material to be treated generally comprises an aqueous slurry containing substantial amounts of water in addition to solid waste material which is generally organic in nature and hence relatively easily oxidized to more easily disposed of breakdown products such as water, $CO_2$ and in some cases easily biodegradable hydrocarbon type materials.

One area in particular in which the wet oxidation process of the present invention can be used is in the sewage industry. Sewage streams, as is well known, are aqueous slurries and contain, among other materials, water, urine, feces, food waste, and various types of paper. Such streams must be properly treated to provide products which can be disposed of without damaging the environment or creating serious health hazards. A specific instance where the treatment of sewage type waste streams is absolutely necessary occurs in manned space flights. The human wastes, which can be considered a concentrated sewage stream, are treated to convert the waste material to products which can be reused, such as for example, potable water, or at the very least to products which pose no health hazards.

In the utilization of the present invention in the treatment of aqueous feed materials such as sewage, the soluble ruthenium salt, usually ruthenium trichloride, is dissolved in the aqueous feed material which as noted above will usually be a two-phase system comprised of an aqueous solution and mixed solid matter. The amount of the ruthenium salt which must be dissolved in the aqueous feed material containing the waste products will vary depending upon the amount of waste products to be oxidized, the size and configuration of the reactor, etc. Generally, however, the amount of the ruthenium salt dissolved will be sufficient to provide a catalytically active surface within the reactor such that at least a portion of the oxidizable waste materials are catalytically converted to innocuous breakdown products.

The reactant feed i.e. the aqueous feed containing the dissolved ruthenium salt is fed to a suitable reaction vessel wherein the temperature is sufficient to effect deposition of ruthenium black on the internal surfaces of the reactor. The reactant is maintained in the reaction vessel in the presence of an oxygen containing gas for a residence time sufficient to oxidize at least a portion of the waste material. When the desired amount of oxidation has occurred, the reaction product containing the oxidation products of the waste material is removed from the reaction vessel.

The temperature in the reactor vessel will generally be maintained from about 450° to about 600° F and more particularly from about 500° to about 580° F. Pressure will generally be sufficient to prevent substantial vaporization of the reactant feed and maintain adequate oxygen partial pressure. Thus for example in the case of a typical sewage stream, pressures from about 4 $MN/m^2$ to about 17 $MN/m^2$ are employed.

The oxygen containing gas present in the oxidation reaction vessel can be pure oxygen or can be an oxygen containing gas such as air. It is generally desirable that the oxygen partial pressure in the reactor be from about 0.7 $MN/m^2$ to about 9 $MN/m^2$. In general, it is found that when a sewage slurry stream is being treated, it is desirable to employ at least about 0.5 and more preferably 0.8 grams of oxygen per gram of solids.

Residence time in the reaction vessel can vary widely depending on the degree of oxidation desired. In the case of a concentrated sewage stream such as described above, residence times of from about 0.25 to about 5 hours and more particularly from about 0.5 to about 2 hours have been found effective. It will be understood that the process can be carried out in either a continuous or batch scale manner.

To more fully demonstrate the invention, the following example is presented.

EXAMPLE

The reaction vessel employed had a volume of 1500 cc and was made from Hastelloy C-276. The reactor was of a baffled design to simulate a plug flow system and minimize back-mixing of reactor discharge with reactor feed. For a liquid flow rate of 1200 cc/hour, the residence time in the reactor was approximately 30 minutes. The reactor was operated at a temperature of approximately 550° F and a total pressure of 15.2 $MN/m^2$. A feed material having a total organic carbon content of about 3500 mg/liter and consisting of a fecal/urine/water slurry containing 4% by weight feces was admixed with pure oxygen and fed to the reactor, the oxygen feed rate being such as to provide an oxygen partial pressure of approximately 7.6MN/m$^2$ in the reactor. Initially, ruthenium trichloride was continuously supplied to the reactor at a rate so as to provide about 0.1 grams of ruthenium trichloride per 460 cc of the fecal/urine/water slurry. Measurement of total organic carbon of the reaction effluent showed levels of between 200 and 300 mg/liter indicating high oxidation efficiency in the reactor. Additionally, water quality achieved from the system was such that passing it through a vapor compression distillation unit and charcoal would provide potable water.

It was found that continuous catalyst introduction into the system was not necessary. Once sufficient ruthenium trichloride had been added to form a deposit of ruthenium black on the internal surfaces of the reactor, further addition of catalyst was unnecessary. After the initial formation of the catalytic surface, the reactor could be run with no noticeable rise in the level of total organic carbon in the effluent,.

It was also found that the system was effective in reducing the ammonia content of the effluent to negligible proportions and that waste streams containing solid materials such as waste paper, food waste, etc. underwent a high degree of oxidation and conversion into easily disposable or usable products.

Although the invention has been described with a certain degree of particularity, it is to be understood that such description has been made by way of example, and that numerous changes in the details of the method and compositions disclosed may be resorted to without departing from the spirit and scope of the invention as hereinafter claimed

I claim:

1. A method of forming catalytic surfaces comprising dissolving a soluble ruthenium salt in a liquid medium, introducing said liquid medium containing the dissolved salt into a reaction vessel having internal surfaces of metallic material, maintaining the operating temperature within said reaction vessel at a temperature such that ruthenium black is deposited on the internal surfaces of said vessel, said ruthenium salt being present in said liquid medium in an amount sufficient to provide a catalytically active amount of ruthenium black on said surfaces of said reaction vessel.

2. The method of claim 1 wherein said soluble ruthenium salt is ruthenium trichloride.

3. The method of claim 1 wherein said liquid medium comprises an aqueous medium.

4. The method of claim 3 wherein said temperature in said reaction vessel is about 175° F or greater and the pressure is sufficient to prevent substantial vaporization of said aqueous medium.

5. The method of claim 4 wherein said soluble ruthenium salt is ruthenium trichloride.

6. A wet oxidation process comprising admixing an aqueous feed material containing oxidizable waste material with a salt of ruthenium which is soluble in said aqueous feed material to form a reactant feed, introducing said reactant feed into a reaction vessel having internal surfaces of metallic material maintaining the operating temperature within said reaction vessel at a temperature such that ruthenium black is disposed on the internal surfaces of said reaction vessel, said salt of ruthenium being present in said aqueous feed material in an amount sufficient to provide a catalytically active amount of ruthenium black on said surfaces of said reaction vessel, maintaining said reactant feed in said reaction vessel in the presence of an oxygen containing gas for a residence time sufficient to oxidize at least a portion of said waste material, removing a reaction product from said reaction vessel and rejuvenating said catalytically active surfaces during said process as is necessary by adding said soluble ruthenium salt to the reactant during said process.

7. The process of claim 6 wherein said soluble salt of ruthenium comprises ruthenium trichloride.

8. The method of claim 6 wherein said aqueous feed material comprises a sewage containing material.

9. The process of claim 7 wherein said temperature in said reaction vessel is from about 450° to about 600° F and the pressure is sufficient to prevent substantial vaporization of said aqueous feed material.

10. The process of claim 9 wherein the pressure in said reactor is from about 4MN/m$^2$ to about 17MN/m$^2$.

11. The process of claim 10 wherein said aqueous feed material comprises a sewage containing material.

12. The process of claim 11 wherein said residence time is from about 0.25 to about 5 hours.

* * * * *